US006597436B2

(12) United States Patent
Suzuki et al.

(10) Patent No.: US 6,597,436 B2
(45) Date of Patent: Jul. 22, 2003

(54) PRINTER

(75) Inventors: Isamu Suzuki, Miyagi (JP); Genzi Oshino, Miyagi (JP); Masayoshi Kikuchi, Miyagu (JP); Makoto Saitou, Miyagi (JP); Susumu Yagi, Miyagu (JP)

(73) Assignee: Tohoku Ricoh Co., Ltd., Shibata-gun (JP)

( * ) Notice: Subject to any disclaimer, the term of this patent is extended or adjusted under 35 U.S.C. 154(b) by 0 days.

(21) Appl. No.: 09/883,924

(22) Filed: Jun. 20, 2001

(65) Prior Publication Data

US 2002/0001072 A1 Jan. 3, 2002

(30) Foreign Application Priority Data

Jun. 30, 2000 (JP) ....................................... 2000-199117
May 2, 2001 (JP) ....................................... 2001-135114

(51) Int. Cl.[7] ................................................ G03B 27/00

(52) U.S. Cl. ....................................... 355/407; 347/222

(58) Field of Search ................................ 399/385, 405; 355/97, 407; 347/222, 171

(56) References Cited

U.S. PATENT DOCUMENTS

| | | | | |
|---|---|---|---|---|
| 4,926,265 A | * | 5/1990 | Yamazaki et al. | 346/24 |
| 5,149,218 A | * | 9/1992 | Iwatani et al. | 271/127 |
| 5,563,646 A | * | 10/1996 | Fukuda | 347/171 |
| 6,226,022 B1 | * | 5/2001 | Morishima et al. | 347/212 |

FOREIGN PATENT DOCUMENTS

JP 7-186414 7/1995

* cited by examiner

*Primary Examiner*—Russell Adams
*Assistant Examiner*—D. Ben Esplin
(74) *Attorney, Agent, or Firm*—Armstrong, Westerman & Hattori LLP

(57) ABSTRACT

A printer comprising a paper storage section provided at the lower portion of a printer body, a feed roller and a pinch roller for feeding paper being brought into contact with each other under pressure and positioned over the paper storage section inside the printer body, a thermal head and a platen capable of pressing and holding the paper therebetween and positioned at the downstream side of the feed roller in the paper feed direction, and a discharge tray for receiving the printed paper and positioned over the paper storage section at the downstream side of the thermal head in the paper feed direction.

9 Claims, 4 Drawing Sheets

PRINTER

BACKGROUND OF THE INVENTION

1. Field of the Invention

The invention relates to a printer for printing on paper fed from a paper storage section by a thermal head and a platen respectively provided inside a printer body, and discharging the printed paper.

2. Description of the Related Art

There has been conventionally a printer of this type as disclosed, for example, in JP. 7-186414, A.

This printer is described with reference to FIG. 6. The printer comprises a printer body 50, a closing lid 51 turnably provided on the printer body 50, a driving roller 52 rotatably attached to the inner surface of the closing lid 51, and a roll paper holder part 54 for holding roll paper 53. A thermal head 55 is brought into contact with the driving roller 52 under pressure by a resiliency or a biasing force of a spring 56. The roll paper 53 is led between the driving roller 52 and the thermal head 55, and the roll paper 53 is printed by the thermal head 55, then the printed roll paper is discharged outside the printer body 50 through a paper discharge port 57 formed on the upper portion of the printer body 50.

However, in the case of such a printer having the paper discharge port on the printer body through which printed paper is discharged outside the printer body, the printed paper discharged through the paper discharge port has to be received directly by hand so as to prevent the printed paper to be discharged through the paper discharge port from dropping on a floor and the like. Accordingly, in this case, if the number of paper to be printed is large, a user is susceptible to inconvenience such that the user can not move away from the printer. To avoid such an inconvenience, a discharge tray is attached to the underside of the paper discharge port on which printed paper is automatically discharged, thereby preventing such an inconvenience.

However, in such a case, a user is liable to accidentally strike against a protruded part of the paper discharge tray or bring down the printer when the user devotes himself or herself in other affairs.

SUMMARY OF THE INVENTION

The invention solved the foregoing problems and it is an object of the invention to provide a printer wherein paper discharged after printing does not drop on a floor and the like even if it is not directly received by a hand, and a discharge tray does not protrude largely from the surface of a printer body.

To achieve the above object, the printer of the invention has the followings constructions.

In the printer for printing on paper fed by a paper feed section from a paper storage section by a thermal head and a platen respectively provided inside a printer body and discharging the printed paper to a paper discharge section, the paper storage section is placed at a lower portion of the printer body. The paper feed section, the thermal head and the platen is placed over the paper storage section, and a paper discharge section is placed at the downstream side of the thermal head in the paper feed direction and positioned over the paper storage section.

With the foregoing construction, the printer can be made very compact in the fore-and-aft direction, namely, in a thickness direction as a whole compared with a printer having a paper storage section provided inside the printer body at the rear portion thereof, a paper feed section and a paper discharge section respectively provided in front of the paper storage section.

In this printer, if all the paper discharge section are provided inside the printer body without protruding outward from the printer body, all the paper discharge section does not protrude outward from the printer body, and hence the printer becomes compact and has a good-looking external shape.

If the paper discharge section is provided integrally with the paper storage section and movable relative to the printer body, and further the paper storage section can be moved to a position where the paper can be set on the paper storage section, the paper can be easily set on the paper storage section by moving the paper storage section to a position where the paper can be set on the paper storage section even if the paper storage section is provided inside the printer body.

Further, if the paper feed section is provided integrally with and movable together with the paper discharge section, the paper discharge section can be moved integrally with the paper storage section, and hence if the paper storage section is moved to a position where paper can be set on the paper storage section, the paper feed section can be moved to a position where the paper is liable to set on the paper feed section at the same time.

The thermal head is preferably attached to the printer body while the platen is attached to a member integrated with the paper storage section and movable together with the paper storage section. In that case, when the paper storage section is moved to a position where the paper can be set thereon, the platen is moved together with the member integrated with the paper storage section so that the platen is moved away from the thermal head.

Accordingly, if there is paper caught between the thermal head and the platen before the paper storage section is moved, the paper is not rendered in a state caught between the thermal head and the platen because the thermal head is left on the printer body side so that the paper is moved together with the platen to the position where the paper can be set on the paper storage section. As a result, it is possible to easily clear a paper jam.

Further, the printer may be further provided with a lock mechanism having a lock member, wherein the lock member moves interlocked with the movement of the paper discharge section and locks the paper feed section so that the paper feed section does not move the paper when the paper discharge section is moved from a position where the paper discharge section can receive the printed paper to a position where the paper can be set on the paper storage section together with the paper storage section.

In that case, when the paper discharge section is moved integrally with the paper storage section to a position where paper can be set on the paper storage section, the lock member of the lock mechanism locks the paper feed section in a state where the paper is not moved, interlocked with the movement of the paper discharge section. As a result, the lock state of paper held by the paper feed section continues until the paper storage section is returned to a position where the paper storage section is before it is moved so that the paper does not drop from the paper feed section in the midway of returning the paper storage section.

Further, if the paper discharge section is supported by a supporting member to be turnable, and the paper discharge section is turnable until the paper feed section is exposed to the front face of the printer body, when the paper discharge section is turned together with the paper feed section, the paper feed section is moved until it is exposed to the front face of the printer body, so that the paper can be easily set.

If the printer further comprises a front cover for covering the front face of the paper storage section, wherein the cover is turnably attached to the paper storage section and it is moved away from the front face of the paper storage section when the cover is opened, the paper storage section is covered with the front cover when the printer operates, thereby assuring security. Further, when the paper storage section is replenished with paper, the front cover can be opened, and thereby the replenishment of paper can be made more easily.

Further, if the paper discharge section is integrally provided with a cutter for cutting the printed paper, when the paper is jammed at the cutter, the paper discharge section is moved away from a setting position of the printer body so that the cutter moves as the paper discharge section is moved, thereby easily clearing the paper jam.

The above and other objects, features and advantages of the invention will be apparent from the following detailed description which is to be read in conjunction with the accompanying drawings.

DETAILED DESCRIPTION OF THE PREFERRED EMBODIMENT

A preferred embodiment of the invention is now described with reference to the attached drawings.

Figure 1:
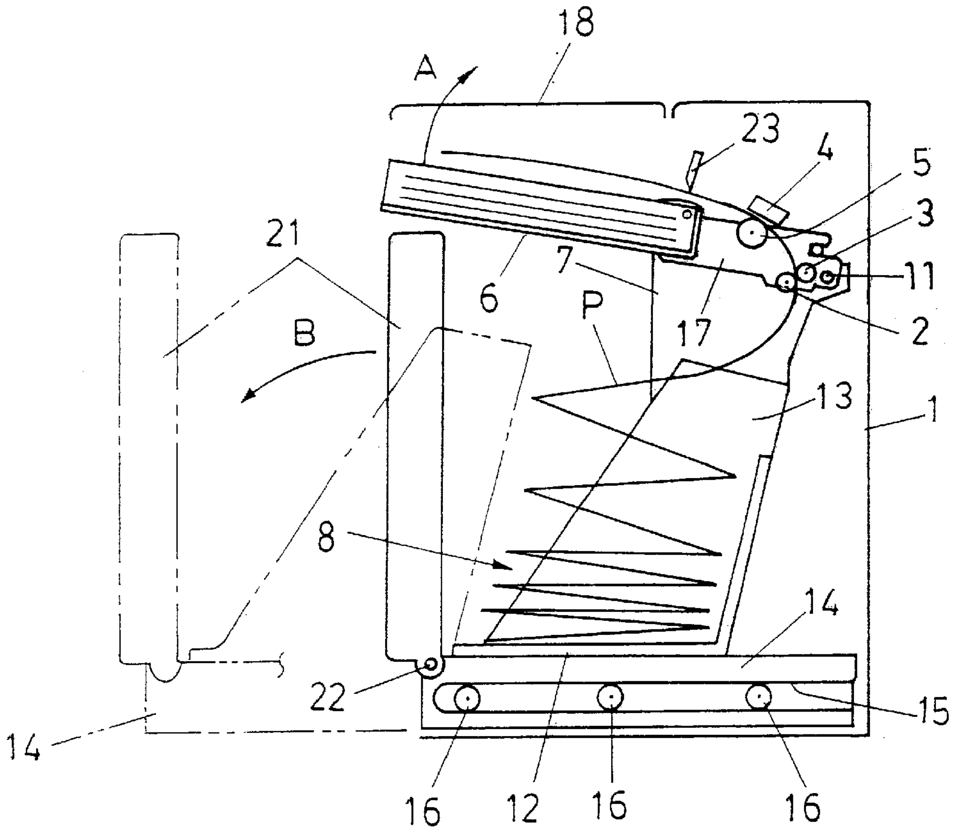
FIG. 1 is a schematic view showing the construction of main constituents of the entire printer according to the invention.

FIG. 1 is a schematic view showing the construction of main constituents of the entire printer according to the invention.

With the construction of the printer shown in FIG. 1, a fan fold paper (thereinafter referred to as "paper") P is supplied and fed from a paper storage section 8 by a paper feed section comprised of a feed roller 2 and a pinch roller 3 which are paired inside a printer body 1.

The paper P is printed by a thermal head 4 which is attached to the printer body 1 inside the printer body 1 and a platen 5 which is attached to discharge section side plates 17, 17 integrated with the paper storage section 8 and is movable together with the paper storage section 8, and the printed paper P is discharged onto a discharge tray 6 constituting a paper discharge section.

The paper storage section 8 is provided inside the printer body 1 at the lower portion thereof, and the feed roller 2 and the pinch roller 3 which feed the paper and are brought into contact under pressure each other are positioned over the paper storage section 8 inside the printer body 1. The thermal head 4 and the platen 5 are disposed at the downstream side of the feed roller 2 in the paper feed direction so that they can hold the paper P therebetween under pressure.

The feed roller 2 is rotatable by a motor 25 (see FIGS. 4 and 5) via a transmission system comprised of a plurality of gears described later. The state of contact under pressure between the feed roller 2 and pinch roller 3 can be released by a pressure release lever not shown.

The discharge tray 6 for receiving the printed paper P is provided at the downstream side of the thermal head 4 in the paper feed direction and positioned over the paper storage section 8. The discharge tray 6 is integrally fixed to the discharge section side plates 17, 17 (only one side appears in FIG. 1) at both side portions thereof, and the discharge section side plates 17, 17 are turnably attached to a holding frame 7 serving as a supporting member in the direction of an arrow A by a shaft 11. The discharge tray 6 receives the printed paper P thereon in a turning position as shown in FIG. 1.

The holding frame 7 is integrally fixed to a movable table 14 of the paper storage section 8. The paper storage section 8 sets the paper P on a storage tray 12. Positions of both edges of the paper P set on the storage tray 12 are restricted by side fences 13, 13 (only one side fence appears in FIG. 1) which can move toward or move away from each other. Both the side fences 13, 13 and the storage tray 12 are respectively attached to the movable table 14, and guides 15, 15 (only one guide appears in FIG. 1) are formed on both sides of the movable table 14.

A plurality of guide rollers 16 which are provided on both side portions of the printer body 1 corresponding to the guides 15, 15 are retained by the guides 15, 15 so as to enable to rotate on and contact with the guides 15, 15. As a result, the movable table 14 can be moved to a position where the paper P can be set on the storage tray 12, as shown in a phantom line in FIG. 1.

When the movable table 14 is pulled out to the position as shown in a phantom line in FIG. 1, the storage tray 12, the pair of side fences 13, 13, the holding frame 7, the discharge tray 6 attached to the holding frame 7, and so on are moved integrally with the movable table 14.

Since the feed roller 2 and the pinch roller 3 serving as the paper feed section are turnably attached to the discharge section side plates 17, 17 which are attached to the holding frame 7 integrated with the paper storage section 8, when the paper storage section 8 is pulled out, both the feed roller 2 and the pinch roller 3 are pulled out together with the paper storage section 8 in the same direction.

The discharge tray 6 is fixed to the discharge section side plates 17 at one end thereof as described above, and the discharge section side plates 17, 17 are supported by the holding frame 7 through the shaft 11 turnably in the direction of the arrow A. The amount of turn of the discharge tray 6 at the position where the discharge tray 6 is pulled out (position in FIG. 3) is limited to a position where a nip at which the feed roller and the pinch roller are brought into contact with each other under pressure is exposed to the front face of the printer body 1 (front face side is a left side in FIG. 2) as shown in FIG. 2.

Figure 2:
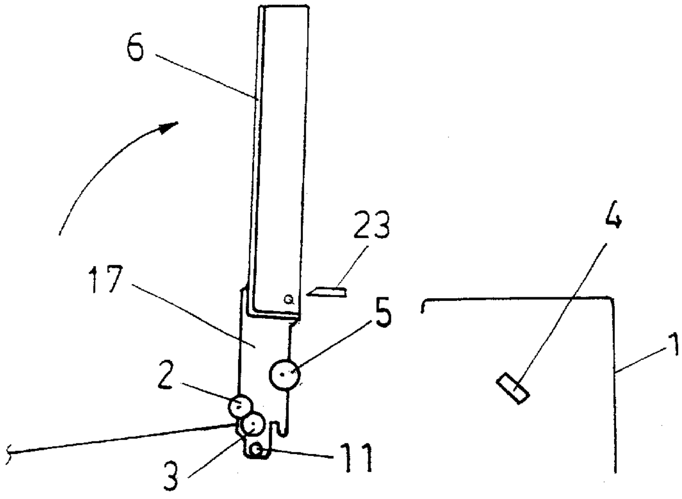
FIG. 2 is a schematic view partially showing a state where a nip at which the feed roller and the pinch roller are brought into contact with each other under pressure is exposed in front of a printer body when a discharge tray provided in the printer is turned.
Figure 3:
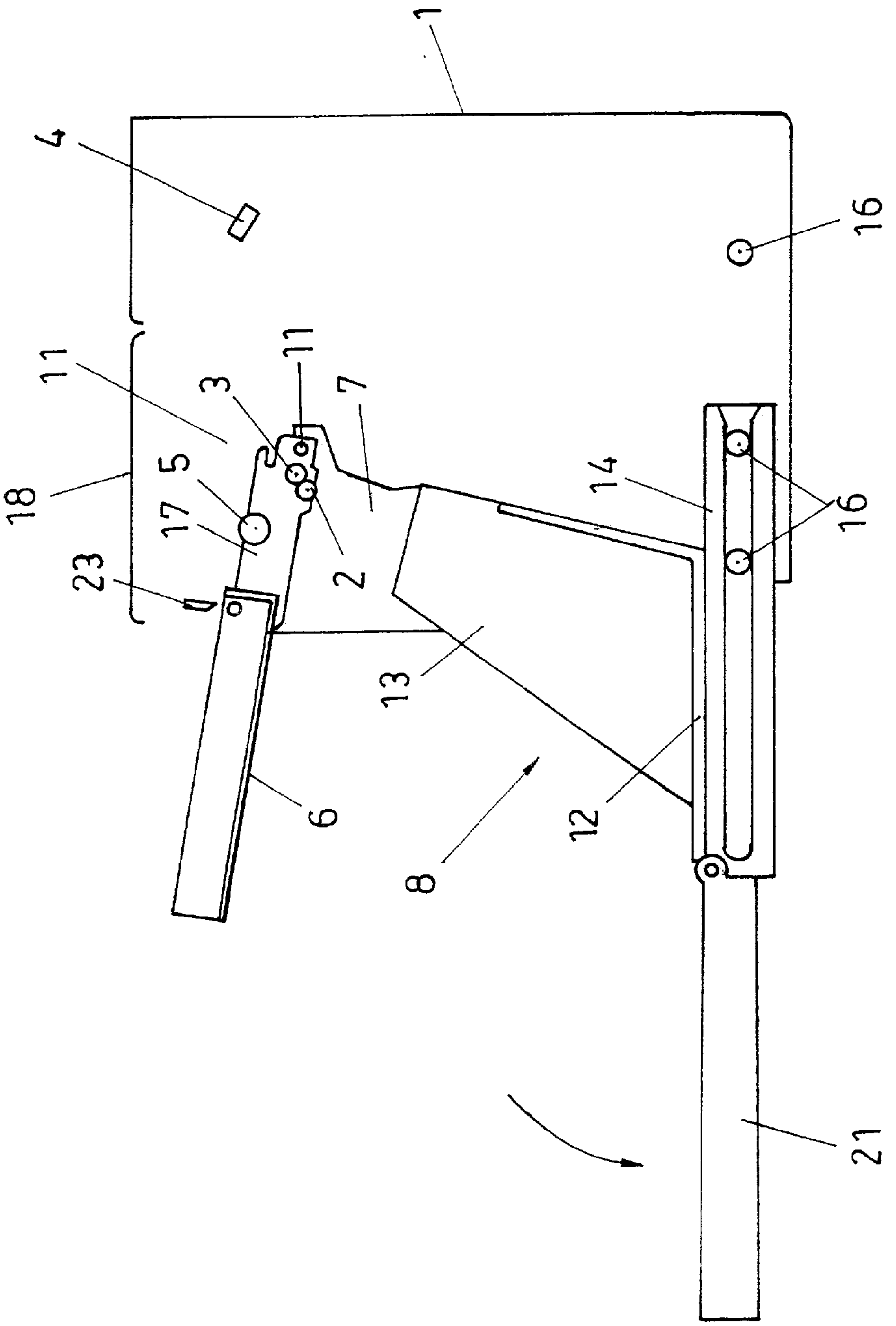
FIG. 3 is a schematic view showing a state where a front cover is released from a paper storage section of the printer after the paper storage section is pulled down.

Depicted by 18 in FIG. 1 is a detachable upper cover provided on the discharge section, and the upper cover 18 is removed when the discharge tray 6 is turned up to the position shown in FIG. 2. The printer has a front cover 21 which covers the front face of the paper storage section 8 as shown in FIG. 1, wherein the front cover 21 is turnably attached to the movable table 14 of the paper storage section 8 in the direction of an arrow B by a shaft 22. When the front cover 21 is opened as shown in FIG. 3, it can be completely moved away from the front face of the paper storage section 8.

A cutter 23 for cutting the printed paper P is fixed to the discharge section side plates 17, 17 and integrated therewith on the paper discharge section provided with the discharge tray 6. Accordingly, even if the paper P is jammed at the cutter 23, the jammed paper P can be easily removed by pulling out the paper storage section 8 to the position shown in FIG. 3.

Figure 4:
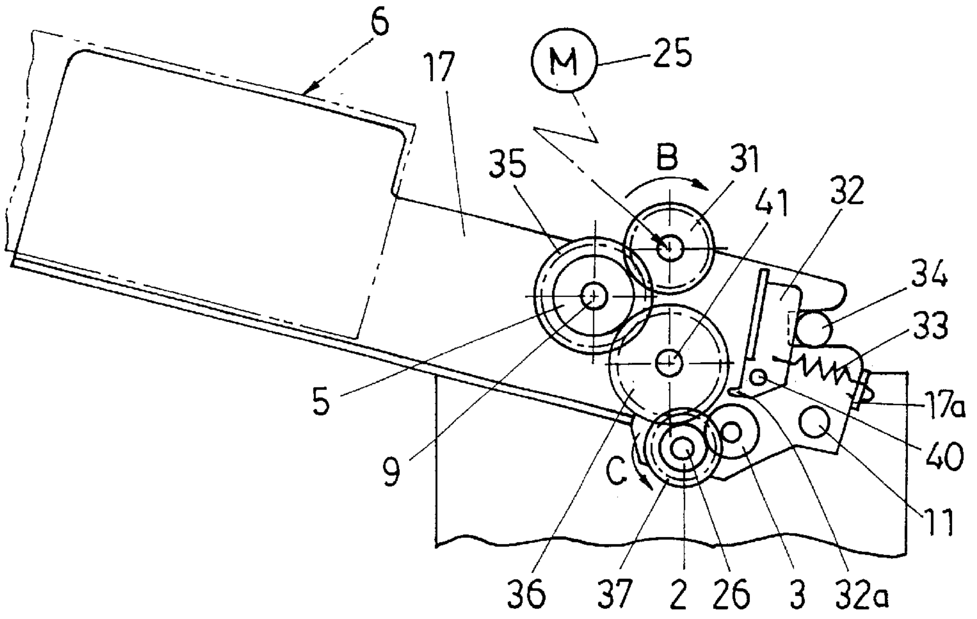
FIG. 4 is a schematic view showing the neighborhood of the discharge tray in a state where it is positioned to receive a printed paper.
Figure 5:
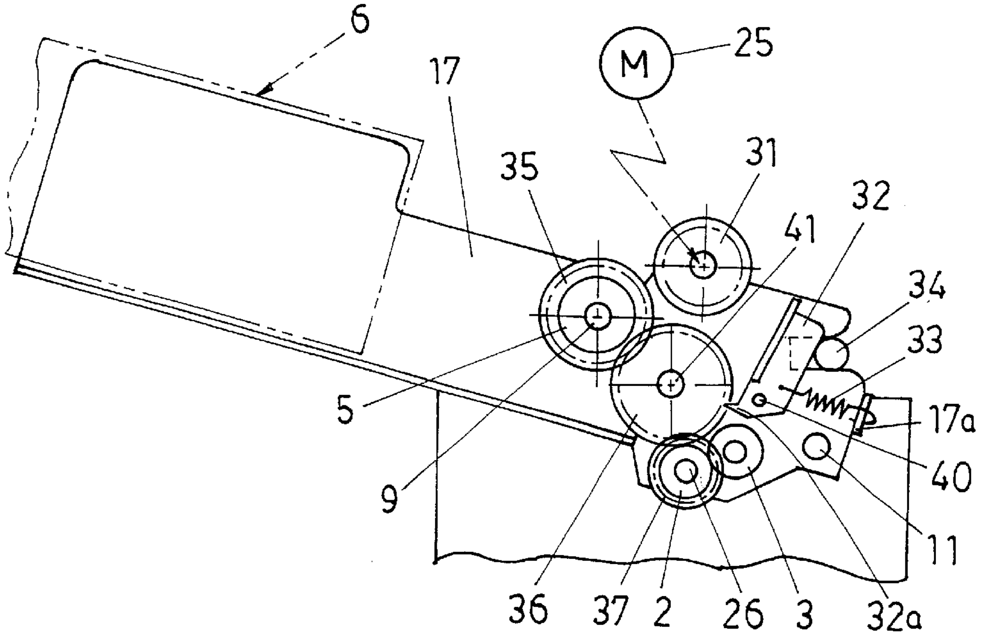
FIG. 5 is a schematic view showing the neighborhood of the discharge tray in a state immediately after the discharge tray is moved in a direction to be pulled out from a printer body.
Figure 6:
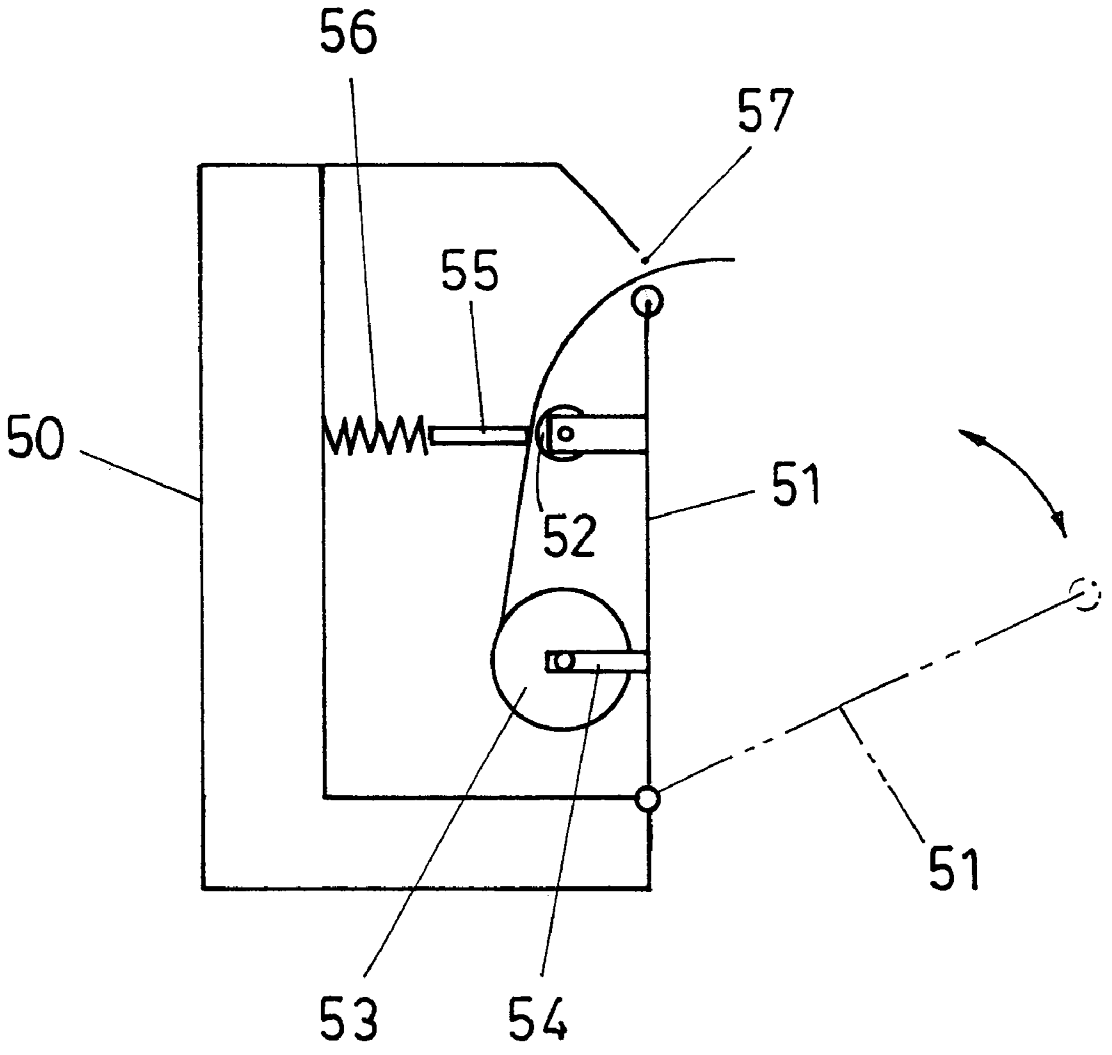
FIG. 6 PRIOR ART
FIG. 6 is a schematic view showing the construction of an example of a conventional printer.

Described next with reference to FIGS. 4 and 5 is a turning force transmission system for transmitting a turning force from the motor 25 to the feed roller 2.

FIG. 4 is a schematic view showing the neighborhood of the discharge tray in a state where the discharge tray is positioned to receive the printed paper. FIG. 5 is a schematic view showing the neighborhood of the discharge tray in a state immediately after the discharge tray is moved in a direction to be pulled out from a printer body.

When the turning force of the motor 25 fixed to the printer body 1 (see FIG. 1) side is transmitted to the feed roller 2 via the turning force transmission system comprised of a plurality of gears, the feed roller 2 is turned in the direction of an arrow C in FIG. 4.

That is, a gear 31 is fixed to a turning shaft of the motor 25 at the printer body 1 side, and a gear 35 is meshed with the gear 31. The gear 35 is attached to a platen shaft 9 supporting the roller shaped platen 5, and the platen shaft 9 is supported by the discharge section side plates 17, 17 via a bearing which rotatably supports the both end portions of the platen shaft 9.

Then, a gear 36 which is rotatably attached to a shaft 41 fixed between the discharge section side plates 17, 17 is meshed with the gear 35, and a gear 37 is meshed with the gear 36. The gear 37 is fixed to one end of a feed roller shaft 26 for supporting the feed roller 2.

Accordingly, when the gear 31 is rotated by the motor 25, the gear 35 meshing with the gear 31 is rotated, and the gear 36 meshing with the gear 35 is rotated. As a result, the gear 37 meshing with the gear 36 is rotated, and thereby the feed roller 2 is rotated in the direction of the arrow C in FIG. 4.

Further, the discharge section side plates 17, 17 for supporting the gears 35, 36, 37 rotatably support a stopper 32, which serves as a lock member, at the right side of the gear 36 in FIG. 4 by a shaft 40. One end of a spring 33 is attached to the stopper 32 and another end of the spring 33 is attached to a spring hook 17*a* formed at the end portion of each discharge section side plate 17. As a result, the stopper 32 is always biased to be turned in a clockwise about the shaft 40 by a tensile or biasing force of the spring 33.

When the right end edge of the stopper 32 is brought into contact with a stay 34 fixed to the printer body 1 (see FIG. 1) at the position shown in FIG. 4, the clockwise turning of the stopper 32 is restricted.

Although the stopper 32 has a retention pawl 32*a* which is at the lower end thereof and protrudes toward the gear 36, the retention pawl 32*a* is moved away from the teeth of the gear 36 at the position shown in FIG. 4.

In a state where the discharge tray 6 is ready to receive the printed paper P thereon, the gears 35, 36, 37 are meshed with one another. In this state, since the gear 35 is meshed with the gear 31 fixed to the turning shaft of the motor 25, the gear 31 is restricted not to rotate (owing to holding torque of the motor) in a state where the motor 25 stops, so that the gear 35 is not rotated. Accordingly, since both the gears 36, 37 are not turned, the feed roller 2 fixed to the feed roller shaft 26 which is also fixed to the gear 37 is not turned.

When the discharge tray 6 is pulled out leftward in from the position shown in FIG. 4 in the case where the printed paper is taken out from the discharge tray 6 or the paper storage section 8 is replenished with the paper P, and the like, a state immediately after the discharge tray 6 is moved becomes a state shown in FIG. 5. That is, parts attached to each discharge section side plate 17 such as gears, namely, the parts other than the gear 31 of the motor 25 and the stay 34 attached respectively to the printer body 1 (see FIG. 1) side are moved leftward in FIG. 4.

As a result, the gear 35 is moved away from the gear 31, so that the meshing therebetween is released. Further, the stopper 32 is turned clockwise in FIG. 5 about the shaft 40 owing to the tensile or biasing force of the spring 33 in response to the movement of each discharge section side plate 17, and the turning of the stopper 32 is restricted at the position where the right end edge of the stopper 32 is brought into contact with the stay 34.

Then, when the discharge tray 6 is further pulled out, the stopper 32 is further turned clockwise in FIG. 5, so that the retention pawl 32*a* formed at the lower end side of the stopper 32 is brought into contact with the teeth of the gear 36 as shown in FIG. 5. As a result, the turning of the stopper 32 is restricted owing to the contact between the retention pawl 32*a* and the gear 36

Further, when the retention pawl 32*a* of the stopper 32 entered between the teeth of the gear 36, the gear 36 is restricted not to turn. Accordingly, the gear 36 is locked in this state, so that the gear 37 meshing with the gear 36 can not turn. Accordingly, the feed roller 2 which is integrated with the gear 37 via the feed roller shaft 26 also can not turn.

As described above, the printer has a lock mechanism such that when the discharge tray 6 serving as the paper discharge section is moved from a position where it can receive the printed paper as shown in FIG. 4 toward a position where the paper can be set on the paper storage section 8 (this position serves also to take out the paper from the discharge tray 6) while integrated with the paper storage section 8, the stopper 32 serving as a lock member is moved while interlocked with the movement of the discharge tray 6, so that the retention pawl 32*a* of the stopper 32 does not turn the gear 36, thereby locking the feed roller 2 of the paper feed section not to move the paper.

According to this embodiment of the invention, functioning as the lock mechanism are the stopper 32, each discharge section side plate 17 and shaft 40 for supporting the stopper 32, the spring 33 for pulling out and biasing the stopper 32, the stay 34, the gears 36, 37, and the like.

Inasmuch as the printer shown in FIG. 1 is provided with the paper storage section 8 inside the printer body 1 at the lower portion thereof, the feed roller 2 and the pinch roller 3 serving as the paper feed section for feeding the paper, the thermal head 4, the platen 5, and the discharge tray 6 respectively provided over the paper storage section 8, the printer can be very compact in the fore-and-aft direction as a whole compared with a printer wherein a paper storage section is provided inside the printer body 1 at the rear portion, and a paper feed section and a paper discharge section are provided at the front of the paper storage section.

Further, since the discharge tray 6 does not protrude forward from the front face of the printer body 1, the discharge tray 6 does not get in the way of the user.

Although the paper storage section 8 is provided inside the printer body 1, it can be pulled out from the printer body 1 toward a position shown in FIG. 3 when the paper P is set on the paper storage section 8, so that the paper P can be easily set on the storage tray 12.

Further, according to the printer, both the feed roller 2 and the pinch roller 3 are movable integrally with the paper storage section 8 to the position shown in FIG. 3. Accordingly, when the paper storage section 8 is replenished with the paper P, the contact under pressure between the feed roller 2 and the pinch roller 3 can be released by the pressure release lever, not shown, at the position shown in FIG. 3. Thereafter, the tip end of the paper is inserted into the nip between the feed roller 2 and the pinch roller 3, then the pressure release lever is operated again to bring the feed roller 2 and the pinch roller 3 into contact with each other under pressure and the paper storage section 8 is pushed to an original position, so that the paper can be easily set on the paper storage section 8 to be ready fed.

When the paper storage section 8 is replenished with the paper P, each discharge section side plate 17 to which the feed roller 2 and pinch roller 3 are attached can be turned together with the discharge tray 6 up to a position, so that if each discharge section side plate 17 is turned at the position shown in FIG. 2, the nip between the feed roller 2 and the pinch roller 3 can be completely exposed from the front face of the printer body 1.

Accordingly, the tip end of the replenished paper can be inserted into the nip between the feed roller 2 and the pinch roller 3 with ease and assurance.

Thereafter, each discharge section side plate 17 is turned to reach the original position and the paper storage section 8 is inserted into the printer body 1 to the position shown in a solid line in FIG. 1. The feed roller 2 does not idle because it is locked by the lock mechanism during the time when the paper storage section 8 and the discharge tray 6 are integrally pulled out from the printer body 1 as described above. Accordingly, the paper inserted into the nip between the feed roller 2 and the pinch roller 3 is not come away from the nip until the paper storage section 8 is inserted into the printer body 1 at a given insertion position. Hence, the paper can be fed with assurance.

Accordingly, the paper P to be fed by the feed roller 2 and the pinch roller 3 after the discharge tray 6 is inserted on a given insertion position is guided by a guide plate not shown, carried between the thermal head 4 and the platen 5, and printed there, then it is cut by the cutter 23 by a given length, and finally it is discharged onto the discharge tray 6.

Further, when the paper P, after it was printed, is merely taken out from the discharge tray 6, the paper P at the side of the paper storage section 8 is pulled out toward the front face of the printer body 1 in a state where the paper P is locked by a lock mechanism and is inserted into the nip between the feed roller 2 and the pinch roller 3, and when the paper P is returned to the original position, next printing can be resumed.

Since the front cover 21 for covering the front face of the paper storage section 8 is turnably provided on the front face of the printer, security can be assured thereby. Still further, when the paper storage section 8 is replenished with the paper P, the front cover 21 is opened or released as shown in FIG. 3, thereby the replenishment of the paper P can be made more easily.

Further, since the discharge section side plates 17 of the paper discharge section is integrally provided with the cutter 23 for cutting the printed paper as shown in FIG. 1, when the paper is jammed at the cutter 23, the discharge tray 6 may be moved from a set position of the printer body 1 shown in FIG. 1 to a position shown in FIG. 3. In this way, since the cutter 23 and platen 5 are moved together as the discharge tray 6 is moved, the jam of the paper P can be easily cleared.

Further, although explained in this embodiment of the invention is a case where the paper P is fan hold paper, the invention can be also applied to an example having a roll holding section using roll paper as explained in the prior art.

The invention as described above can achieve the following effects.

Since a paper storage section is provided in the printer body at the lower portion thereof and the paper feed section for feeding paper and the paper discharge section and the like are provided over the paper storage section, the printer can be made very compact as a whole in the fore-and-aft direction compared with a printer having a paper storage section provided inside the printer body at the rear portion, and the paper feed section and the paper discharge section provided in front of the paper storage section.

Further, the paper discharge section is provided over the paper storage section provided inside the printer body, the printed paper can be discharged onto the paper discharge section without protruding the paper discharge section largely from the surface of a printer body.

Still further, if the paper discharge section does not protrude outward from the printer body, the printer becomes compact and has a good-looking external shape.

More still further, if the paper discharge section and the paper storage section are integrally movable to a position where paper can be set on the paper storage section, the paper can be easily set on the paper storage section by moving the paper storage section to a position where the paper can be set on the paper storage section even if the paper storage section is provided inside the printer body.

Further, if the paper feed section and the paper discharge section are integrally movable, the paper discharge section is moved integrally with the paper storage section, and hence if the paper storage section is moved to a position where paper can be set on the paper storage section, the paper feed section is moved to a position where the paper is liable to set in the paper feed section. Accordingly, the replenished paper can be easily set to the paper feed section.

Further, suppose that the thermal head is attached to the printer body, and the platen is attached to a member integrated with the paper storage section and movable together with the paper storage section, when the paper storage section is moved to a position where the paper can be set thereon, the platen is moved together with the member integrated with the paper storage section and is moved away from the thermal head, and thus, if there is paper caught between the thermal head and the platen, the paper is not still caught between the thermal head and the platen after the paper storage section is moved.

As a result, the paper jam can be easily cleared. Further, since the platen is moved away from the thermal head, the thermal head can be easily cleaned or replaced with another one.

Further, if the lock mechanism having the lock member is moved while interlocking with the movement of the paper discharge section is provided, when the paper discharge section is moved together with the paper storage section from a position where it receives the printed paper to a position where the paper can be set on the paper storage section, the lock mechanism locks the paper feed section not to move the paper while interlocking with the movement of the paper discharge section, so that the paper held by the paper feed section is continuously rendered in a locked state until the paper storage section is returned to a position where the paper storage section is before it is moved, and hence the paper does not drop from the paper feed section in the midway of returning of the paper storage section. Accordingly, when paper feeding is resumed, the paper can be fed with certainty.

Further, in the case where the printer is structured such that the paper is fed upward from the paper storage section positioned at the lower portion and discharged to the paper discharge section positioned at the upper portion in the front face of the printer body, it is made to be difficult to set the paper on the paper feed section because the paper feed section is located at the innermost section of the printer body. However, by constructing the paper discharge section such that it is turnably supported by a supporting member and is turnable until the paper feed section is exposed to the front face of the printer body, when the paper discharge section is turned with the paper feed section, the paper feed section can be moved to a position where it is exposed to the front face of the printer body, so that the paper can be easily set.

Still further, if the front cover for covering the front face of the paper storage section is turnably attached to the paper storage section, the paper storage section is covered with the front cover when the printer operates, thereby assuring security. Further, when the paper storage section is replenished with paper, the front cover can be opened or released from the paper storage section, thereby the replenishment of paper can be made more easily.

Further, if the paper discharge section is integrally provided with a cutter for cutting the printed paper, when the paper is jammed at the cutter, the paper discharge section is moved away from a setting position of the printer body so that the cutter moves as the paper discharge section is moved, thereby easily clearing the paper jam.

What is claimed is:

1. A printer for printing on paper fed by a paper feed section from a paper storage section by a thermal head and a platen provided inside a printer body and discharging a printed paper to a paper discharge section, wherein the paper storage section is placed at a lower portion of the printer body, the paper feed section, the thermal head and the platen are respectively placed in the printer body and positioned over the paper storage section, and the paper discharge section is placed at a downstream side of the thermal head in a paper feed direction and positioned over the paper storage section, wherein the paper discharge section and paper storage section are movable together in and out of the printer body.

2. The printer according to claim 1, wherein the paper discharge section does not protrude outward from the printer body but entirely accommodated in the printer body.

3. The printer according to claim 1, wherein the paper feed section and the paper discharge section are connected and movable together in and out of the printer body.

4. The printer according to claim 1, wherein the thermal head is attached to the printer body while the platen is attached to a member integrated with the paper storage section and movable together with the paper storage section.

5. The printer according to claim 4, further comprising a lock mechanism having a lock member, wherein the lock member is movable while interlocked with a movement of the paper discharge section, and when the paper discharge section is moved from a position where the paper discharge section can receive the printed paper to a position where the paper can be set on the paper storage section together with the paper storage section, the lock member locks the paper feed section so that the paper feed section does not move the paper.

6. The printer according to claim 4, wherein the paper discharge section is turnably supported by a supporting member, and the paper discharge section is turnable to a position where the paper feed section is exposed to the front face of the printer body.

7. The printer according to claim 5, wherein the paper discharge section is turnably supported by a supporting member, and the paper discharge section is turnable to a position where the paper feed section is exposed to the front face of the printer body.

8. The printer according to claim 1, further comprising a front cover for covering the front face of the paper storage section, wherein the front cover is turnably attached to the paper storage section, and the front cover moves away from the front face of the paper storage section when the front cover is opened.

9. The printer according to claim 1, wherein the paper discharge section is integrally provided with a cutter for cutting the printed paper.

* * * * *